E. L. AND E. A. LINDBLAD.
MONEY SAVING CLOCK.
APPLICATION FILED AUG. 26, 1919.
1,363,986. Patented Dec. 28, 1920.
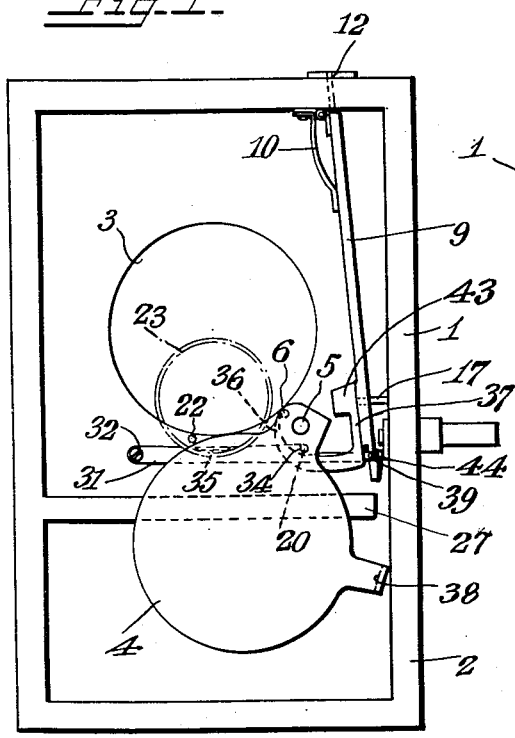
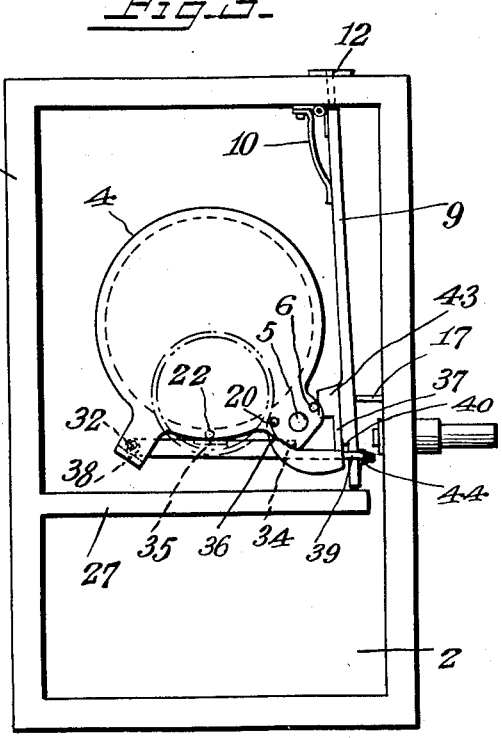
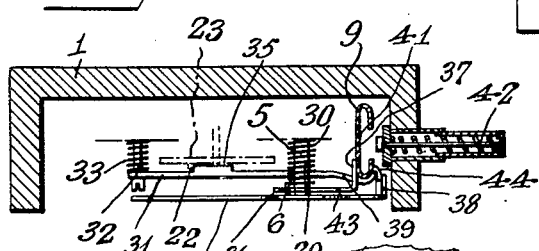
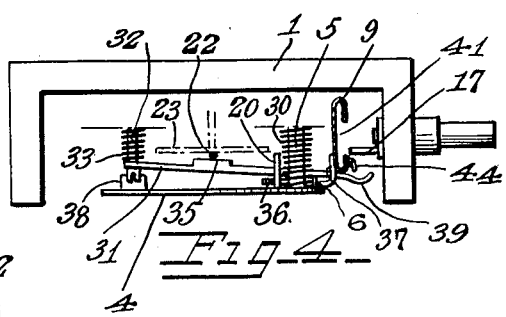
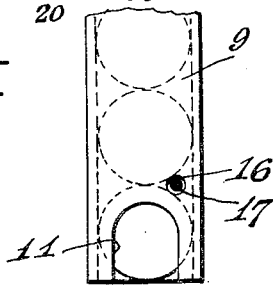
Inventors.
E. L. Lindblad and
E. A. Lindblad
By H. R. Kerslake
Attorney

UNITED STATES PATENT OFFICE.

ELIS LAMBERT LINDBLAD AND EGRON ASTRILD LINDBLAD, OF STOCKHOLM, SWEDEN.

MONEY-SAVING CLOCK.

1,363,986.  Specification of Letters Patent.  Patented Dec. 28, 1920.

Application filed August 26, 1919. Serial No. 320,035.

*To all whom it may concern:*

Be it known that we, ELIS LAMBERT LINDBLAD, and EGRON ASTRILD LINDBLAD, both subjects of the King of Sweden and residents of Ringvägen 14, Stockholm, Sweden, have invented certain new and useful Improvements in Money-Saving Clocks, of which the following is a specification, reference being made to the accompanying drawings.

The present invention relates to so called money saving clocks which are intended, as is well known, at a predetermined time, for instance a fixed day in each week, to collect a certain sum of money. In order that this payment may take place regularly, such clocks are, as a rule, provided with a mechanism, which, in one way or another, gives a reminder that the time for payment has arrived. This reminder is usually brought about in these clocks by the said mechanism causing the movement of the clock in some way to stop, and, moreover, in some cases, also bringing some device in front of the dial in order to give a more effective reminder of the necessity of making the required payment.

The present invention has for its object to remove the inconveniences belonging to money saving clocks of previously known types and, for that purpose comprises a mechanism which is designed so that at a calculated time it brings a screen, disk or the like in front of the dial and renders the latter invisible without any action being brought to bear on the movement itself of the clock, which thus is unaffected by the said bringing forward of the screen and therefore is kept going even during the time when the dial is invisible. On this account, the owner of the clock, on the one hand, when the screen with the aid of a coin introduced into the mechanism is moved aside from the dial, is not obliged to take any action to set the clock to correct time and, on the other hand, the insurance company, for example, is not exposed to the loss which in previously known money saving clocks arises owing to the postponement of the calculated time for the payment of the required amount.

In a mechanism constructed in accordance with the present invention, the screen by means of which the dial is rendered invisible is under the action of a spring which strives to bring the screen into position in front of the dial, which position may be termed the covering position. When the screen assumes this position, which serves as a reminder that a payment is to be made, it is moved aside thence and is held, till the next payment is to be made, in an invisible position by a catch or detent, which position may be termed the locking position. This catch, which is held in the required position by a spring, is itself acted on at the fixed time by a part driven by the movement of the clock, which part then releases the catch, so that the spring acting on the screen can bring it into covering position. The screen and the coin channel into which the fixed sum is to be introduced are in such connection with one another that at the same time as the screen is brought into the covering position, the said channel will assume such a position that a coin introduced into the same will reach the place in the channel where it can be acted upon by a device accessible from without which is intended to bring the screen into locking position, and which acts only if the coin is at the last mentioned place in the channel.

On the accompanying drawing is shown a mechanism, constructed in accordance with this invention.

Figure 1 is a front view of the apparatus with the parts of the mechanism in the positions they assume when the dial is visible.

Fig. 2 is a view of the part in the same position as in Fig. 1, viewed from above, and partly in section.

Figs. 3 and 4 show the same as Figs. 1 and 2, but with the parts of the mechanism in the positions they assume when the dial is covered, and Fig. 5 shows the lower end of the coin channel, viewed from the broad side.

In all the figures 1 designates the clock case, the lower part of which 2 may be arranged as a coin receiver, and which is provided with an opening 3 for the dial, while 4 is the screen, which is rotatable around a pivot 5. In the upper part of the case and under the slot 12 the coin channel 9 is rotatably fixed with the aid of a hinge, the channel being held in the position shown in Fig. 1 by the spring 10. The channel has at its lower end in each side wall an opening 11 (Fig. 5), in order that a coin dropped to the bottom of the channel may be acted upon by a rod 42 reaching outside the clock case. Above the opening 11 there is arranged in each of the side walls of the channel 9 near one edge of the same an opening 16 (Fig. 5), into which openings when the channel is in the position shown in Fig. 1 enters a pin 17 fastened in the case.

When the channel 9 is moved to the position shown in Fig. 3 it is disengaged from the pin 17 whereby the lowest coin loses the support of the pin and falls down and is left standing on the bottom 27, the coins above the same obviously accompanying it in its fall. The screen 4 is under the action of a spiral spring 30, which is placed on the pivot 5 of the screen. 31 is a catch lever, which is rotatable on a pivot 32 and is acted on by a spiral spring 33 also mounted on the said pivot. In the upper edge of the lever 31 there is a shoulder 34, intended for the pin 20 on the screen 4. On the side of the lever 31 facing the toothed wheel 23, which is driven by the movement of the clock, there is at its upper edge a projection 35, which the pin 22 on the said toothed wheel is intended to strike during the rotation of the latter, and thereby against the tension of the spring 33 to press down the lever 31 so far that the pin 20 is released from the shoulder 34 and thus enable the spring 30 to bring the screen 4 into covering position. When the screen passes into this latter position, in which it swings around the pivot 5, the pin 20 comes against an arched arm 36, which extends from a plate 37 fixed to the coin channel 9, thereby drawing, against the tension of the spring 10, the coin channel from the position shown in Fig. 1 to the position shown in Fig. 3, in which position it stops, at the same time as the screen is caused to stop, owing to the fact that a shoulder 38 arranged on the screen strikes against the pivot 32. On the movement which the coin channel performs during this movement of the screen, the edge of the channel slides against an arm 39 which forms a prolongation of the lever 31 and which is curved, as indicated in Figs. 2 and 4. In consequence of this form of the arm 39, the lever is moved so far sidewise that the projection 35 is released from the pin 22, whereby the spring 33 acting on the lever 31 is enabled to carry said lever upward until the arm 39 comes against the lower edge 40 of the part 41 whereby the plate 37 is fixed to the channel 9. After this adjustment of the lever, the projection 35 has been brought above the pin 22 and can therefore at any time again approach the toothed wheel 23 as the projection 35 extends only so far along the lever 31 that it makes no obstacle for the pin 22 in its further travel during the rotation of the wheel 23. At the same time as the channel 9 on the adjustment of the screen was transferred into the position shown in Fig. 3, the channel was removed from the pin 17, so that, if a coin previously rested against the latter, this coin thereby fell down into the lowest part of the channel against the bottom 27, or if there was no coin previously in the channel, a coin falls down when being dropped through the slot 12 directly onto the bottom 27. As soon as a coin is in the lowest part of the channel resting against the bottom 27, the channel can be operated by a rod 42, acted on by a spring and displaceably arranged on the side of the case, as is shown in Figs. 1 to 4, and which is arranged in a suitable position so that, on being pressed in with its end, it strikes the coin in the lowest part of the channel, but, if there is no coin in the channel, passes through the same without causing the channel to change position. When the pressure on the rod 42 ceases, the rod is again pushed out by the spring acting on it. If there is a coin in the channel at the time when the rod 42 is pushed in, and if the latter is pressed sufficiently far in, a projection 43 on the plate 37 strikes the pin 6 on the screen 4, whereby the latter, against the tension of the spring 30, is made to descend or is moved aside from the dial, until the pin 20 comes in contact with the lever 31 and first presses down the same, whereupon the said lever, when the pin 20 reaches the shoulder 34, is again moved upward by the spring, and by means of the said shoulder retains the screen in the lowered position, when the mechanism is again in the screen holding position. When the pressure on the rod 42 ceases, the spring 10 returns the coin channel 9 into its original position, during which movement the edge of the channel is sliding along the arm 39 and the said arm, owing to its curved shape, is swung by the plate 37 somewhat to the side inward, so that the projection 35 comes approximately up to the toothed wheel 23. At the same moment as the coin channel stops in its original position shown in Fig. 1, the end of the arm 39, which is somewhat yielding and which at any rate during the later part of the last mentioned movement of the coin channel slides on the end of a projection 44 mounted on the channel, falls in toward the said projection, whereby the channel is locked in the said position, so that it shall not be possible, by reversing and shaking the apparatus, to take coin out again through the channel.

When returning to its original position as just mentioned the coin channel is moving the coin standing on the bottom 27, along this body. The bottom is spaced slightly from the fall of the front wall, against which wall the channel stops, and leaves an opening large enough to allow the coin to drop out of the channel in the box 2 when the channel stops against the wall.

Having now described our invention, what we claim as new and desire to secure by Letters Patent is:

1. In a money saving clock, a coin channel, a detent mechanism, an element driven by the movement of the clock for releasing the detent mechanism, a screen intended for the covering or exposing of the dial of the clock and adapted to be readjusted with the aid of a coin introduced into the coin channel, and the coin channel being movably arranged and designed to be readjusted when a coin is in the channel, and if the dial is covered, to, on such a readjustment, move the screen toward the side, and thereby set the screen into engagement with the detent mechanism so that the screen is held away from the dial by the detent mechanism until a new payment is made, when the detent mechanism is released by said element driven by the movement of the clock, whereby the screen is released and moves in front of the dial.

2. A money saving clock in accordance with claim 1, wherein the detent mechanism consists of a lever having a shoulder, a spring acting on the lever, and a pin on the screen designed to engage the shoulder on the readjustment of the screen, whereby the screen is held away from the dial.

3. A money saving clock as claimed in claim 1 wherein there is provided a lever having a shoulder, a pin on the screen, the element driven by the movement of the clock being placed close to the lever, and a pin on the element which during the rotation of the element at a fixed time readjusts the lever in such a way that the pin on the screen is released from the shoulder on the lever, so that the screen may thereby assume its position in front of the dial.

4. A money saving clock in accordance with claim 1 wherein the coin channel in each of its side walls is provided with an opening, a rod arranged in the opening and designed to be acted on from outside the clock without the channel being readjusted, provided there is no coin in that part of the channel, but, if there is a coin in the same, strike the latter, and thereby causes the readjustment of the channel.

5. A money saving clock as claimed in claim 4, wherein each of the side walls of the coin channel above the openings is provided with another opening, a pin fixed on the clock case for entering the last mentioned opening when the screen is moved aside from the dial and the coin channel is in its extended position, thereby serving to prevent a coin dropped into the channel from descending down to the place in the channel where the first mentioned openings are situated.

6. A money saving clock as claimed in claim 1 wherein a pin (6) is provided on the screen, a spiral spring acting on the screen and striving to bring the screen into position in front of the dial and a projection on the coin channel which, when the coin channel is swung and the dial is covered, strikes the said pin on the screen and thereby moves the screen aside from the dial.

7. A money saving clock as claimed in claim 5 wherein an arched arm is carried on the coin channel, a pin on the screen designed to move against the arched arm after screen passes over to its position in front of the dial so as to readjust the channel by withdrawing the channel from the pin which is fixed on the clock case whereby a coin resting on the said pin in the channel is allowed to drop into that part of the channel where the first mentioned openings are situated.

8. A money saving clock as claimed in claim 3 wherein a curved arm is provided on the detent lever for engagement with the coin channel to insure of a sidewise displacement of the lever during the movement of the coin channel so that the lever will be removed from the path of the pin on the element driven by the movement of the clock and spring means for returning the lever and arm to the position held before being acted upon by the pin on the element driven by the movement of the clock.

9. A money saving clock in accordance with claim 8 wherein a coin receiver is provided beneath the coin channel, a projection on the coin channel against which the arm is designed to rest when the screen is moved aside from the dial and the channel has assumed its extended position, whereby the coin channel is locked fast and undue removal of the coin out of the coin receiver is prevented.

In witness whereof we have hereunto set our hands in presence of two witnesses.

ELIS LAMBERT LINDBLAD.
EGRON ASTRILD LINDBLAD.

Witnesses:
C. TH. SUNDHOLM,
R. TÖTTERMAN.